United States Patent
Hsiao et al.

(10) Patent No.: US 6,937,548 B2
(45) Date of Patent: Aug. 30, 2005

(54) METHOD OF OPTIMAL POWER CALIBRATION

(75) Inventors: Kuen-Yuan Hsiao, Taipei Hsien (TW); Stanley Liow, Taoyuan Hsien (TW)

(73) Assignee: VLA Technologies, Inc., Taipei Hsien (TW)

( * ) Notice: Subject to any disclaimer, the term of this patent is extended or adjusted under 35 U.S.C. 154(b) by 670 days.

(21) Appl. No.: 10/115,730

(22) Filed: Apr. 3, 2002

(65) Prior Publication Data

US 2002/0150012 A1 Oct. 17, 2002

(30) Foreign Application Priority Data

Apr. 17, 2001 (TW) ........................................ 90109098 A

(51) Int. Cl.⁷ ................................................. G11B 7/00
(52) U.S. Cl. .................................. 369/47.53; 369/275.3
(58) Field of Search ............................. 369/47.5, 47.51, 369/47.52, 47.53, 53.22, 53.26, 53.27, 53.31, 59.11, 116, 275.1, 275.3

(56) References Cited

U.S. PATENT DOCUMENTS 5,592,463 A * 1/1997 Muramatsu et al. ..... 369/47.53
6,711,107 B2 * 3/2004 Chao et al. ............... 369/47.52
2002/0110065 A1 8/2002 Wang ....................... 369/47.53

* cited by examiner

*Primary Examiner*—Thang V. Tran
*Assistant Examiner*—Bach Vuong
(74) *Attorney, Agent, or Firm*—J.C. Patents

(57) ABSTRACT

A method of optimal power calibration adapted to rewritable or recordable disks is disclosed. In addition to an original power calibration area (PCA) in the inner track of a disk, another rearranged PCA is allocated in the lead-out area of the outmost track. Two optimal power calibration processes are performed on both of the power calibration areas allocated on the inner and outmost tracks to respectively derived optimal recording powers. A relation curve is established by using these two optimal recording powers that this relation curve describes the relationships between the optimal recording powers of the recording positions and the distances from these recording positions to the center of the optical storage disk. Required optimal recording power of any recording position can be derived from the relation curve while performing data recording operations.

20 Claims, 4 Drawing Sheets

METHOD OF OPTIMAL POWER CALIBRATION

CROSS-REFERENCE TO RELATED APPLICATION

This application claims the priority benefit of Taiwan application serial no. 90109098, filed on Apr. 17, 2001.

BACKGROUND OF THE INVENTION

1. Field of the Invention

The invention relates in general to a method of optimal power calibration. More particularly, the invention relates to a method of optimal power calibration that can derive the optimal recording power for any position of an optical storage medium such as a recordable or rewritable disk.

2. Description of the Related Art

Rewritable disks (CD-RW) and the recordable disks (CD-R) are currently popular optical storage medium in the market for data storage that a rewritable disk can vary or rewrite data stored inside, while the recordable disk can be used to record data only once. Both the rewritable and recordable disks have to undergo an optimal power calibration (OPC) process to obtain required optimal recording power before being used. FIG. 1 illustrates the operating flow of the conventional OPC process, which is basically performed on a power calibration area (PCA) of an inner track of the disk. In step 100, the recording head jumps to the count area of PCA in the inner track, while the number of recorded blocks (indicating the number of times that the OPC processes have been performed) is read for obtaining the address of the empty power calibration area in step 110. In step 120, the recording head jumps to the empty power calibration area and then starts to perform optimal power calibration process in step 130. Under OPC process, the recording head uses 15 (fifteen) different powers to write 15 frames of calibration data (or, OPC pattern) into the empty power calibration area. The recording head jumps to positions where the written operations have just performed so that the burned calibration data can be read out for determining the optimal recording power in the following steps 140, 150 and 160. The recording head then moves to the count area of the last empty PCA in step 170 and registers that one more OPC process is performed in step 180. Finally, the measured optimal recording power is used to record data onto the disk in step 190. All steps shown in FIG. 1 follow the specifications defined in Orange Book for CD-RW disks.

Conventional approaches for measuring the optimal recording power of disks are adapted to a constant linear velocity (CLV) mode rather than to a constant angular velocity (CAV) mode because the recording head follows different linear velocities for recording data in the inner and outer tracks under CAV mode. The linear velocities under CAV mode are proportional to the distances from the recording position (or, data block) to the center of the disk, while the velocities for recording the outer tracks can be as high as 2.5 times of that for recording the inner tracks. Such a difference may cause failures while recording the outer tracks by directly referring the optimal recording power derived from the power calibration area of the inner tracks. Although CLV mode is now the broadly used approach, however, it significantly consumes more recording time than that of the CAV mode. Additionally, even the CLV mode is adopted everywhere of a disk; different material coated on the inner and outer tracks should raise different requirements for recording. There is no solution now that overcomes data recording failures arisen from different material coated as aforementioned because the conventional OPC process can only find out the optimal recording power suitable for the inner tracks rather than whole the optical storage disk.

SUMMARY OF THE INVENTION

The principal object of the invention is to provide a method that obtains the optimal recording powers suitable for both the inner and outer tracks of a rewritable or recordable disk. A relation curve, which is a characteristic information illustrative of overall optimal recording powers of the disk is established. In the embodiment, the relation curve illustrates overall optimal recording powers by demonstrating the relationships between the optimal recording powers and the distances from the center of the disk to the recording positions. Therefore the optimal recording power can be derived for every recording position on a disk whether CLV or CAV mode is adopted, and regardless of what kind of material is coated on the inner and outer tracks.

The disclosed method can be applied to a recordable storage medium such as a rewriteable disk or a recordable disk. Both the recordable and rewritable disks contain power calibration areas in their inner tracks. An optimal power calibration process is performed on the power calibration area of the inner track as conventional. Another power calibration area is rearranged at the outmost track of the optical storage disk and another power calibration process is performed on the rearranged power calibration area. Any data block of the disk may be used to record data by referring a relation curve established by using these two optimal recording powers. This relation curve that demonstrates the relationships between the optimal recording powers and the recording positions is used as an optimal recording power reference for recording operations performed later. Any optimal recording power of the currently recording position can be derived from the relation curve when performing a normal data recording operation.

In one embodiment of the invention, the power calibration performed on the power calibration area in the outmost track may damage a "lead-out" area. However, data accessing operations in the future will be normally performed because those data stored in so-called "lead-out" area is unusable while recovering the recorded data from the outmost tracks. By measuring the optimal recording powers for the inner and outmost tracks of the disk, the data block at any position of the disk can be recorded by means of the optimal recording power derived from the relation curve no matter CLV or CAV mode is adopted.

Both the foregoing general description and the following detailed description are exemplary and explanatory only and are not restrictive of the invention, as claimed.

DESCRIPTION OF THE PREFERRED EMBODIMENTS

Figure 1:
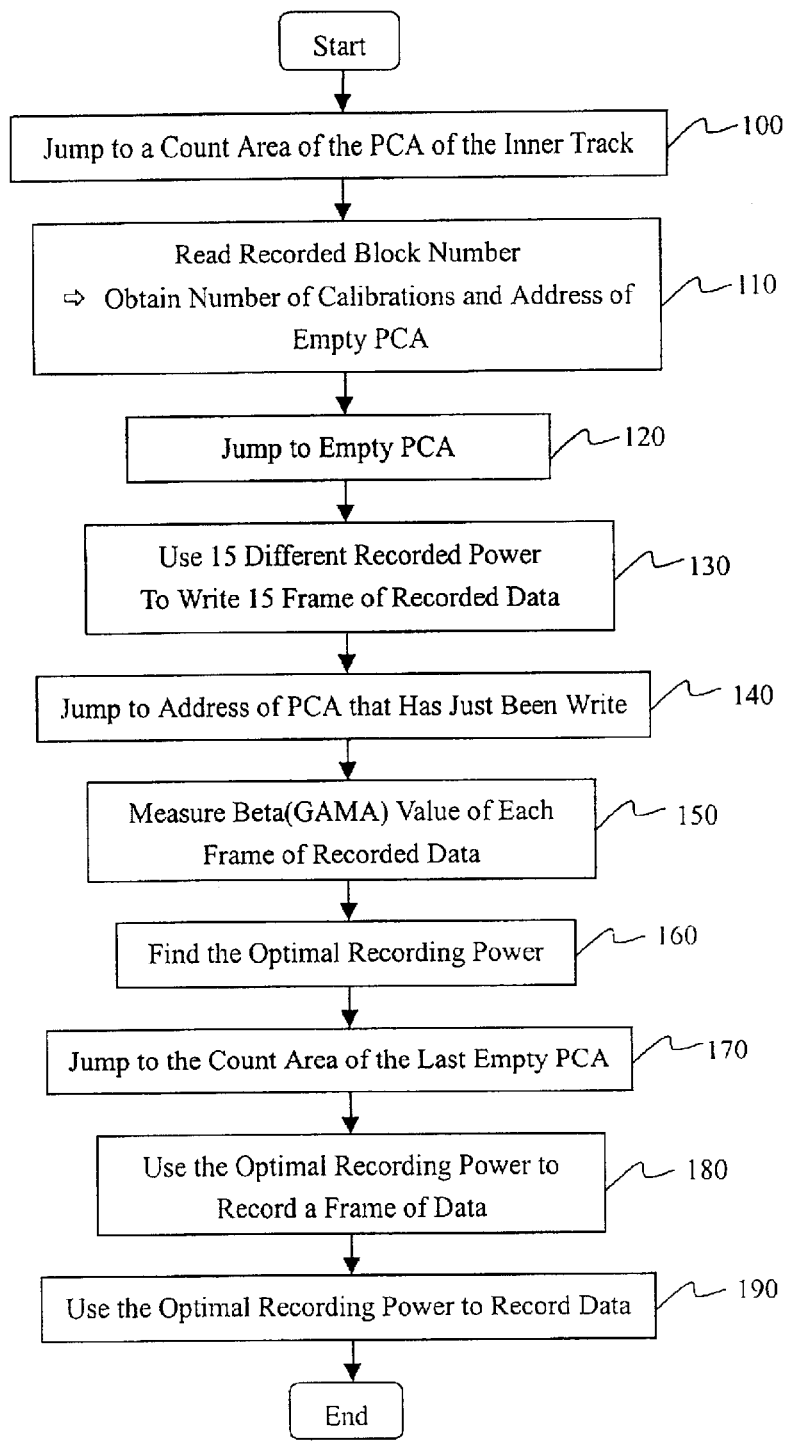
FIG. 1 shows an operating flow illustrative of a conventional optimal power calibration process.
Figure 2A:
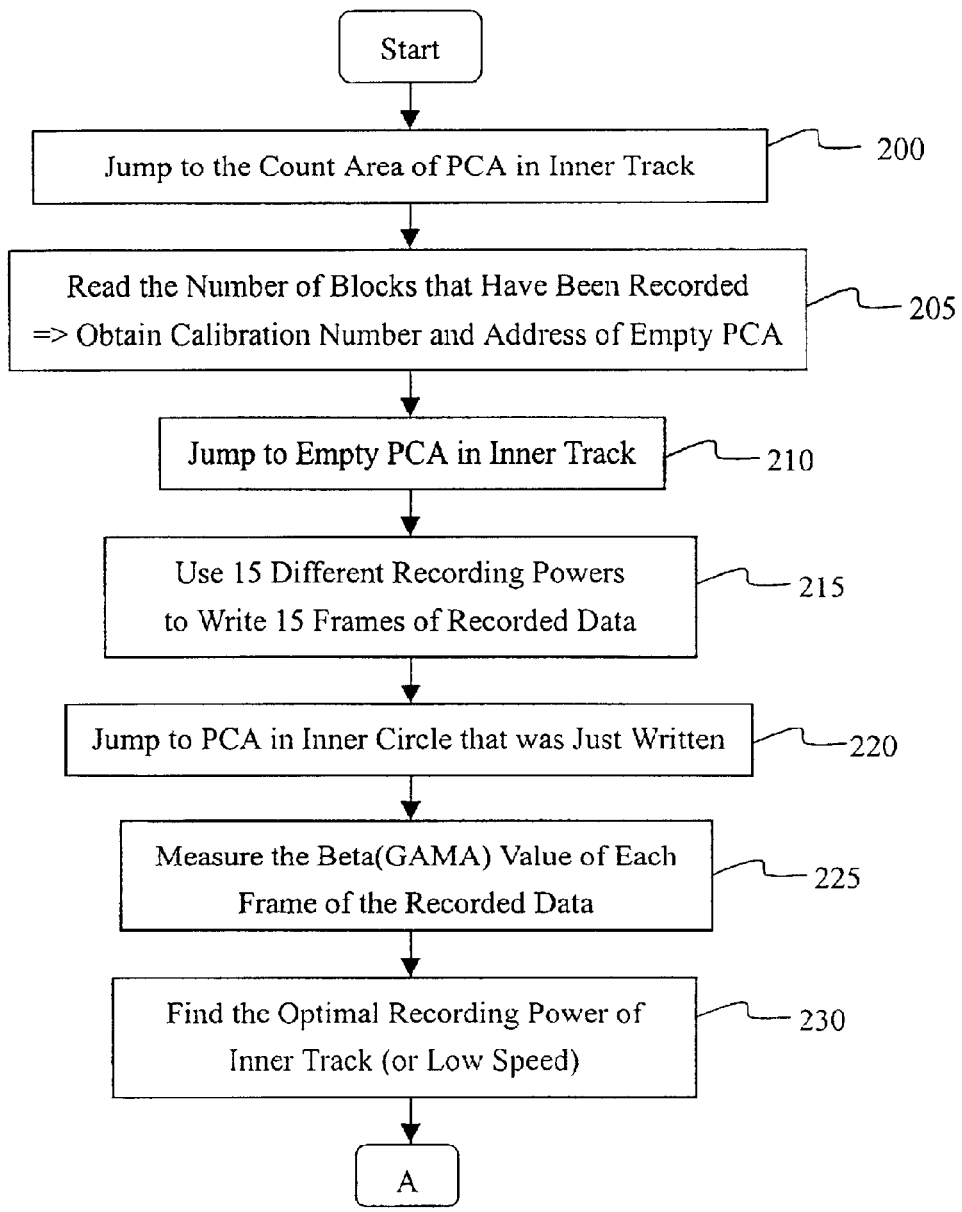
FIGS. 2A and 2B show an operating flow illustrative of an optimal power calibration process according to the invention.
Figure 2B:
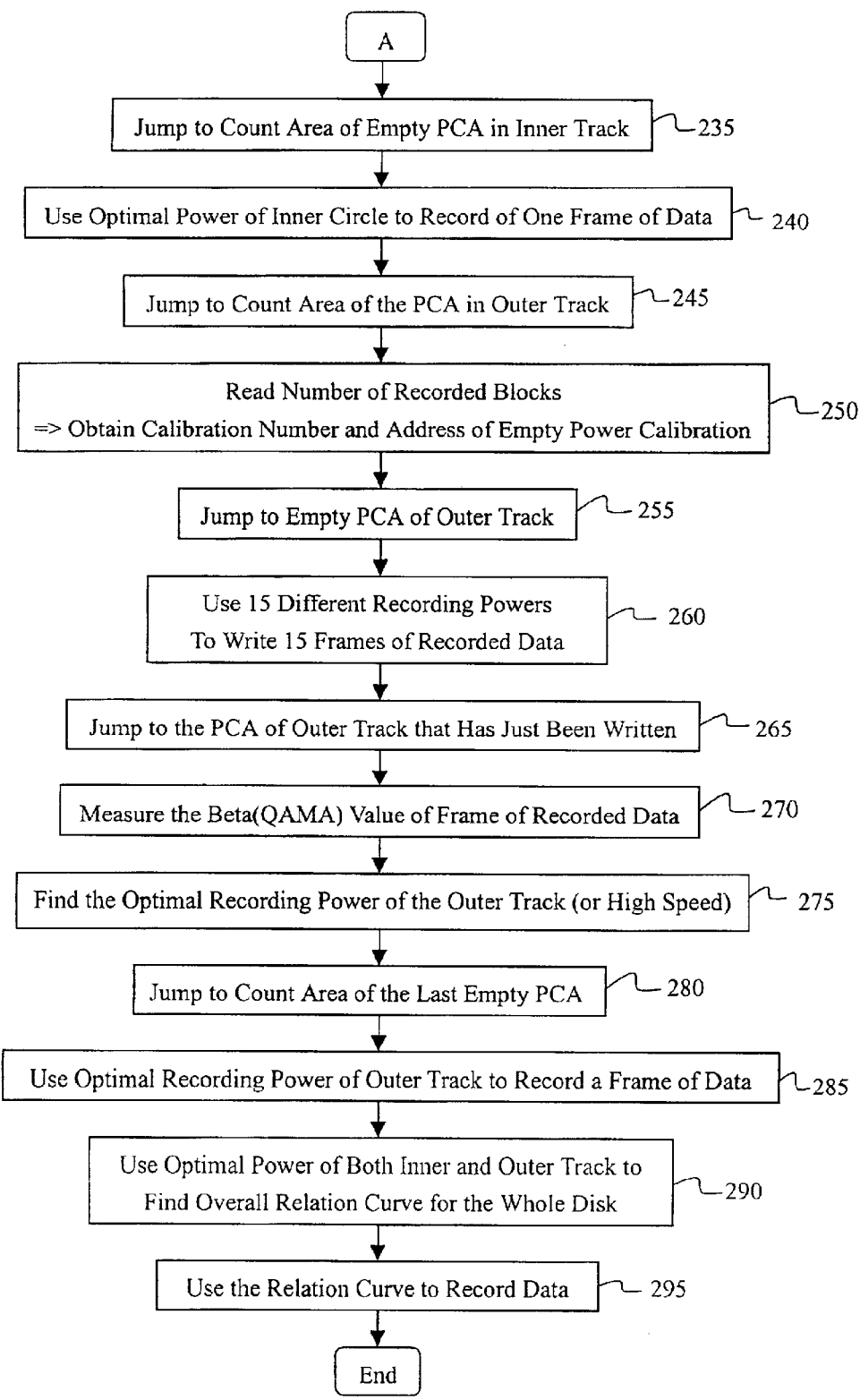
Figure 3:
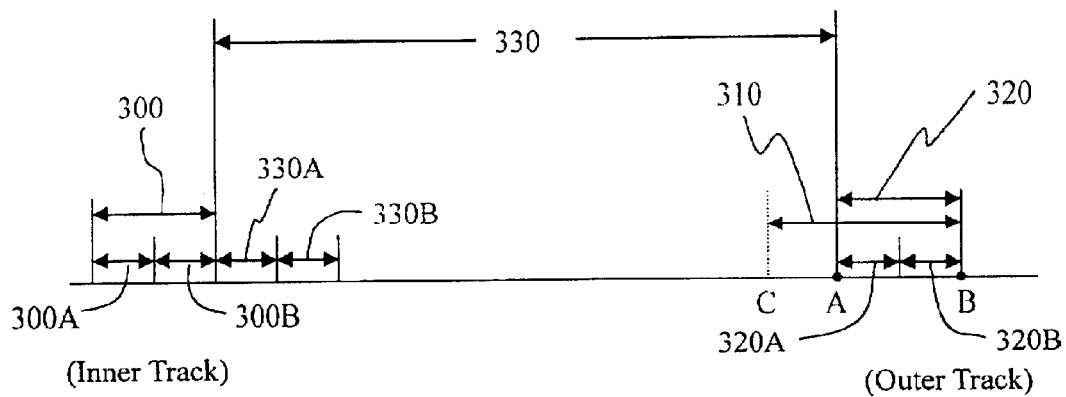
FIG. 3 shows a diagram illustrative of the rearranged PCA in the disk according to the invention.

FIG. 2A and FIG. 2B demonstrate an optimal power calibration process according to the invention while FIG. 3 shows a cross section for illustrating the positions where the original (in the inner track) and rearranged (in the outmost track) power calibration areas are allocated. Referring to FIGS. 2A, 2B and 3, the recording head firstly jumps to an original power calibration area 300 (further including a test area 300A and a count area 300B) in an inner track of the disk in step 200. The number of times that the OPC processes have been performed on the currently recorded disk is obtained (from the count area 300B) in step 205; therefore the address of the empty power calibration area (in test area 300A) in the inner track can be accessed for performing the sequential OPC process. The recording head then jumps to the empty power calibration area in step 210 after finding required address. The OPC process is then actuated by the recording head to write 15 frames of calibration data on the empty power calibration areas with 15 different recording powers in step 215. Next, the recording head then jumps to the position where the written operations have just performed so that the calibration data can be read out for determining the optimal recording power of the inner track (or low speed) in steps 220, 225 and 230 as conventional. The recording head jumps to the last empty area of the count area 300B in step 235 and then applies the measured optimal recording power of the inner track to perform a recording operation on the count area 300B in step 240 (which indicates another OPC process is performed to the disk one more time).

As shown in FIGS. 2A and 2B, after obtaining the optimal recording power from the original PCA 300, the recording head jumps to the outmost track of the disk. In FIG. 3, an optimal power calibration is performed on a rearranged power calibration area 320 (further including a test area 320A and a count area 320B) in step 245. Again, the recording head reads a counting value from the count area 320B to obtain the number of times that OPC processes have been performed to the currently disk and then derives the address of the empty power calibration area (in the test area 320A) of the outmost track in step 250. The recording head jumps to the empty power calibration area of the outmost tracks in step 255 to start an OPC process with 15 different recording powers. In step 260, 15 frames of calibration data (OPC pattern) are recorded to the empty power calibration area inside the rearranged PCA 320 of the outmost tracks. The recording head then jumps to the address where the 15 frames are recorded to read out the calibration data for determining the optimal recording power of the outmost tracks (or high speed) in steps 265, 270 and 275. The optimal recording power can be determined by following the rules defined in Orange Book. After the recording head moves to the count area 320B of the last empty PCA in step 280, it then records a frame of data to register that one more OPC (or, data recording) operation is performed in step 285. Thereafter, a relation curve can be established for the currently used disk by using the optimal recording powers from the inner and outmost tracks in step 290. Finally, the relation curve is then used to record data into a program area 330 (may further includes a program memory area 330A and a lead-in area 330B in practice) of the disk in step 295 by deriving associated optimal recording powers from the relation curve.

Figure 4:
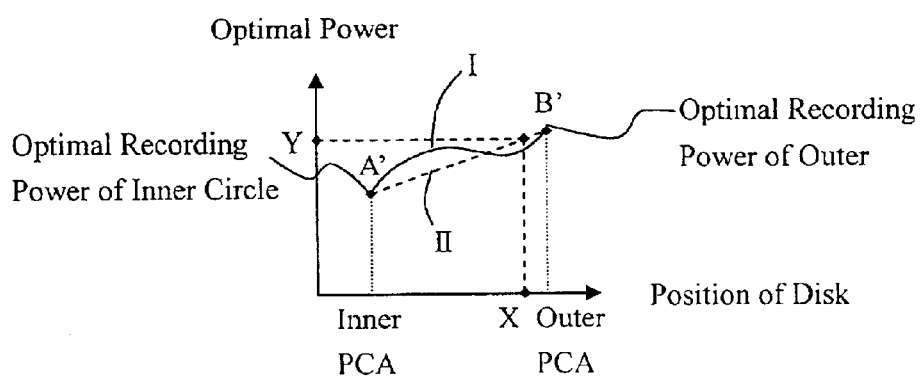
FIG. 4 shows a relation curve illustrative of the relationships between the optimal recording powers and the recording positions of the disk according to the invention.

As shown in FIGS. 2A and 2B, the optimal recording powers of the inner and outmost tracks are used to establish a relation curve illustrative of the relationships between the optimal recording powers and the distances from the recording positions (or data blocks) to the center of the disk. In practice, the relation curve can be established by an interpolation approach by following a predefined equation and FIG. 4 shows an exemplary relation curve according to the embodiment. As noted, the relation curve (indicated by a label I) may be described by any polynomial equation (e.g., a curve by following a second order polynomial equation) or even by a line which directly connects two points (i.e., A' and B') associated with these two optimal recording powers (e.g., a dot line indicated by a label II). A person having ordinary skills in the art should build up the relation curve by using any equation suitable for disks, but any similar modification or rearrangement within the spirits of the invention should be included in the scopes of the appended claims. And optimal recording power of any where on the disk can be derived from the relation curve so that any data recording operation may be performed based on the derived optimal recording power. For example, an optimal recording power (e.g., Y) associated with a recording position (e.g., position X) may be mapped out from the relation curve shown in FIG. 4 according to this recording position. The invention trickily takes the advantage of the characteristic defined in the Orange Book to create required rearranged PCA 320 on the outmost track in the embodiment. Although the rearranged PCA 320 of the outmost track may overlap portions of the lead-out area 310; however, normal data accessing operations will not be affected in the future for some reasons as follows. Firstly, the rearranged PCA 320 in the embodiment will not be accessed when the disk is not fully used for recording users' data. Additionally, the Orange Book only identifies each lead-out area to hold at least 30 (thirty) seconds but no further constraint to what kind or type of data should be stored therein (practically, some specific patterns (e.g., pattern "AA") burned in the former areas of the lead-out area 310 to notify the recording head that it has come across the program area 330). It is obvious that data accessing operations can be normally performed as long as the lead-out area 310 holds at least 30 seconds even it contains usable data (such as PCA 320 in the embodiment) stored inside. In other word, the rearranged PCA 320 starts from points A to B as shown in FIG. 3 should hold at most 30 seconds, wherein the point B indicated the last point being used for recording data and the point A is a point inside the lead-out area 310. The length of rearranged PCA 320 (or, the time interval which the PCA 320 holds) can be designed as various requirements, but this rearranged PCA 320 should hold at most 30 seconds for preventing rearranged PCA 320 from overlapping with program area 330. In practice, the disclosed rearranged PCA 320 (from point A to B in FIG. 3) may hold about 15~20 (may be less, as requirements of various applications) seconds and reserve the aforementioned specific patterns for notifying the recording head. The recording head may jump to point A and find associated addresses for performing OPC processes on the rearranged PCA 320 after finding the address of point A. Please note that the address of point A can be easily found by reference with point B (e.g., tracing back to point A from point B along disk spiral track) because the capacity of a currently used disk (which implies where the point B can be found) is registered in associated inner tracks of the disk (e.g., the first lead-in area of the disk). On the other hand, the lead-out area 310 hold unusable data practically, which indicates that any information stored in the lead-out area 310 will not be incorrectly recognised even the disk is burned to contain fully recorded data. Furthermore, identity frames can be used for recording data into both the original PCA 300 and rearranged PCA 320 under OPC processes, which indicates that any OPC pattern (e.g., ATIP pattern or others) can be recorded into the rearranged PCA 320. As mentioned above, there is no further constraint about what kind or type of OPC pattern is used in rearranged PCA 320 as long as the lead-out area 310 holds at least 30 seconds. Basically, different OPC patterns can be applied in the aforementioned PCA of the embodiment, but any similar modification within the spirit of the embodiment should be included in the scopes of the appended claims. Moreover, an optical storage disk having single data session or multi data sessions may employ the disclosed method for recording data stored therein, and both recordable or rewritable disks can use the disclosed method for recording data (of course, the recordable disks may be used to record data just once).

In conclusion, the disclosed method measures the optimal recording power of both the inner and outmost tracks of an optical storage disk. A relation curve that illustrates the relationships between the optimal recording powers and the distances from the recording positions to the center of the disk is established by employing an interpolation approach. Associated data recording operation can be performed on everywhere in program area(s) of an optical storage disk by using the optimal recording powers derived from the relation curve whatever CLV or CAV mode is used.

It is appreciated that people of ordinary skill in the art may apply the method of optimal power calibration provided by the invention to any kind of recordable storage medium in addition to the rewritable and recordable disks. The rearranged power calibration area is preferably selected from a non-data operation area such as the outmost circle of the disk. In addition, an interpolation method is used to obtain the relation curve. In fact, other data analysis methods can also be applied to obtain various relation curves. Alternatively, only two calibration areas can be used for the method.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A data recording method for an optical storage medium comprising:
   performing a first optimal power calibration process on an original power calibration area of said optical storage medium;
   obtaining a first optimal recording power while performing said first optimal calibration process;
   performing a second optimal power calibration process on a rearranged power calibration area of said optical storage medium;
   obtaining a second optimal recording power while performing said second optimal calibration process;
   deriving a characteristic information illustrative of overall optimal recording powers of said optical storage medium by using said first optimal recording power and said second optimal recording power; and
   performing a data recording operation on said optical storage medium by using an optimal recording power derived from said characteristic information.

2. The method according to claim 1, wherein said optical storage medium is a rewritable (CD-RW) disk or a recordable (CD-R) disk.

3. The method according to claim 1, wherein said original power calibration area is allocated in an inner track of said optical storage medium and said second power calibration area is rearranged on an outmost track of said optical storage medium.

4. The method according to claim 3, wherein said second power calibration area is rearranged inside a lead-out area of said optical storage medium.

5. The method according to claim 4, wherein said second power calibration area holds at most 30 seconds while said optical storage medium being accessed.

6. The method according to claim 1, wherein said characteristic information illustrative of said overall optimal recording powers is a relation curve established by using said first optimal recording power and said second optimal recording power.

7. The method according to claim 6, wherein said relation curve illustrates a relationship between an optimal recording power of a recording position of said optical storage medium and a distance from said recording position to a center of said optical storage medium.

8. The method according to claim 7, wherein said optimal recording power of said recording position inside said optical storage medium is mapped out from said relation curve.

9. A method of deriving an optimal recording power for a recording position of an optical storage medium comprising:
   performing a first optimal power calibration process on an original power calibration area of said optical storage medium, wherein said original power calibration area is allocated in an inner track of said optical storage medium;
   obtaining a first optimal recording power from said original power calibration area while performing said first optimal power calibration process;
   performing a second optimal power calibration process on a rearranged power calibration area of said optical storage medium, wherein said rearranged power calibration area is allocated in an outmost track of said optical storage medium;
   obtaining a second optimal recording power while performing said first optimal power calibration process;
   establishing a relation curve by using said first optimal recording power and said second optimal recording power; and
   deriving an optimal recording power for any recording position of said optical storage medium from said relation curve.

10. The method according to claim 9, wherein said optical storage medium is a rewritable (CD-RW) disk or a recordable (CD-R) disk.

11. The method according to claim 9, wherein said second power calibration area is rearranged inside a lead-out area of said optical storage medium.

12. The method according to claim 11, wherein said second power calibration area holds at most 30 seconds while said optical storage medium being accessed.

13. The method according to claim 9, wherein said relation curve illustrates a relationship between said optimal recording power of said recording position inside said optical storage medium and a distance from said recording position to a center of said optical storage medium.

14. The method according to claim 13, wherein said optimal recording power of said recording position inside said optical storage medium is mapped out from said relation curve.

15. An optical storage medium having at least one data session for storing data comprising:
   a first power calibration area in an inner track of said optical storage medium, wherein a first optimal power calibration process is performed on said first power calibration area to derive a first optimal recording power;

a second power calibration area in an outmost track of said optical storage medium, wherein a second optimal power calibration process is performed on said second power calibration area to derive a second optimal recording power; and a program area allocated between said first power calibration area and said second power calibration area, wherein an optimal recording power of a recording position inside said program area is derived from a relation curve established by using said first optimal recording power and said second optimal recording power.

16. The optical storage medium according to claim 15, wherein said optical storage disk is a rewritable (CD-RW) disk or a recordable (CD-R) disk.

17. The optical storage medium according to claim 15, wherein said second power calibration area holds at most 30 seconds while said optical storage medium is accessed.

18. The optical storage medium according to claim 15, wherein said relation curve illustrates a relationship between said optimal recording power of said recording position and a distance from said recording position to a center of said optical storage medium.

19. The optical storage medium according to claim 18, wherein said optimal recording power of said recording position inside said optical storage disk is mapped out from said relation curve.

20. The optical storage medium according to claim 15, wherein an identity optical power calibration pattern is used to store into said first power calibration area and said second power calibration area while performing said first optimal power calibration process and said second optimal power calibration process.

* * * * *